Feb. 18, 1936.  E. C. ABBE  2,031,244
METHOD OF MAKING HINGE LEAVES
Filed Sept. 15, 1932  4 Sheets-Sheet 1
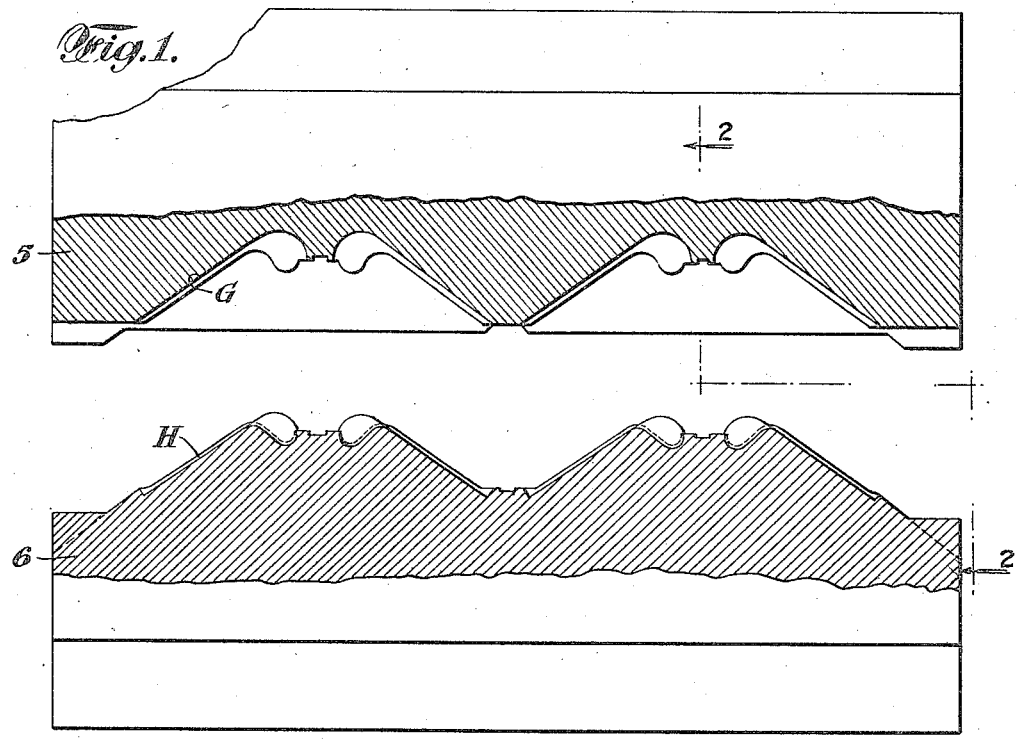
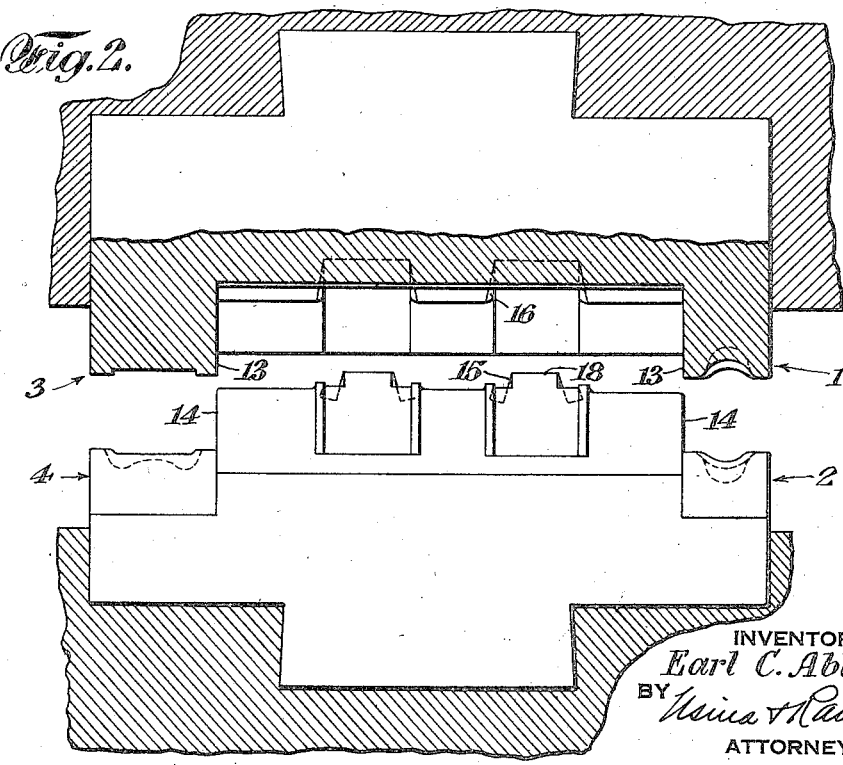

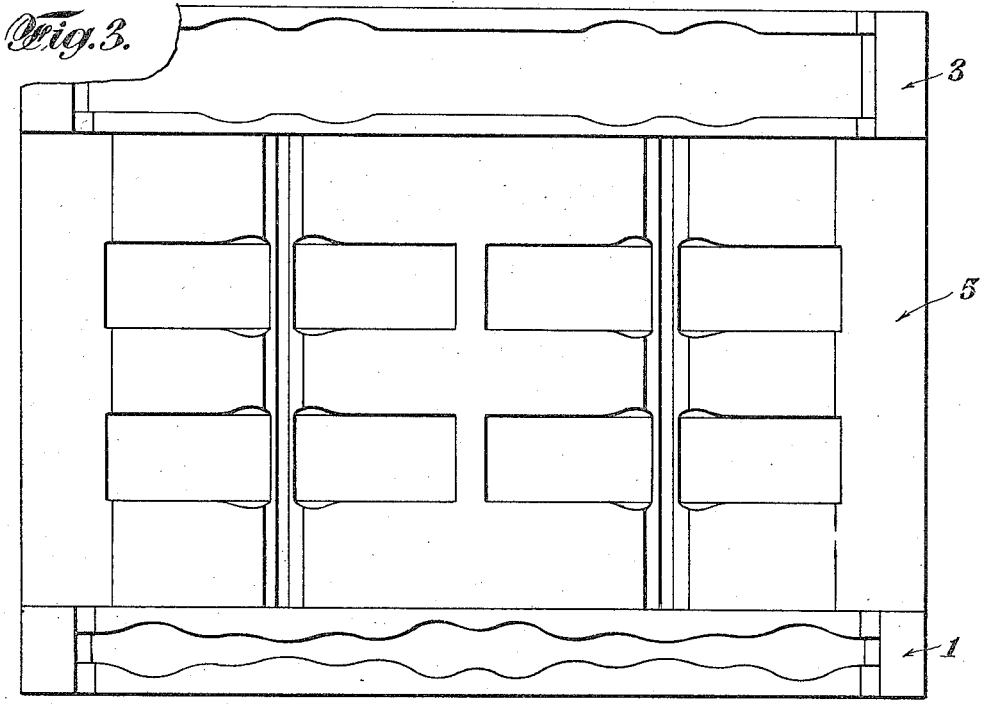
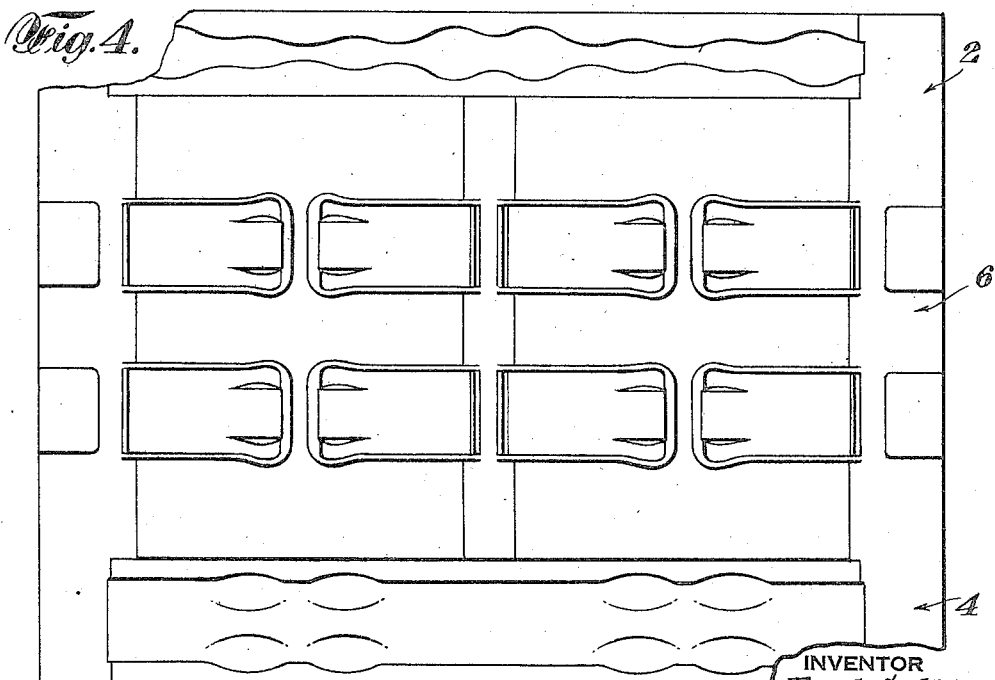

Feb. 18, 1936.  E. C. ABBE  2,031,244

METHOD OF MAKING HINGE LEAVES

Filed Sept. 15, 1932  4 Sheets-Sheet 3

INVENTOR
Earl C. Abbe
BY
ATTORNEYS

Feb. 18, 1936.  E. C. ABBE  2,031,244
METHOD OF MAKING HINGE LEAVES
Filed Sept. 15, 1932  4 Sheets-Sheet 4
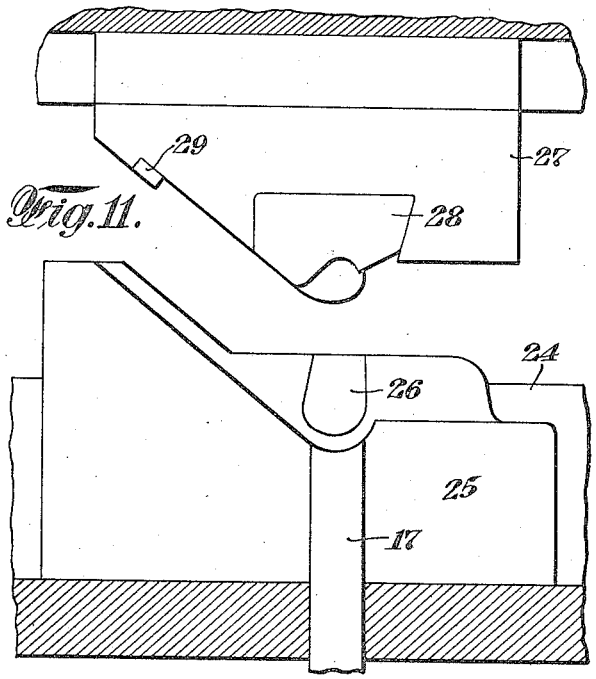
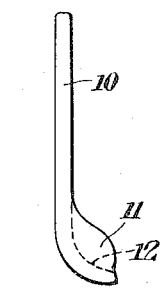
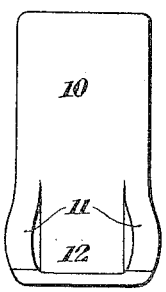
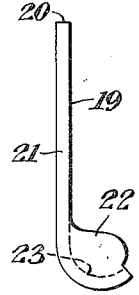
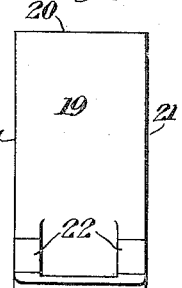
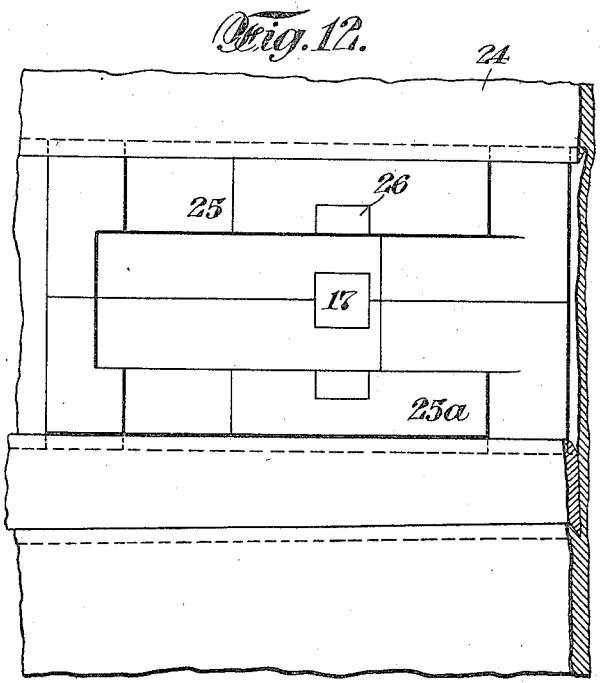
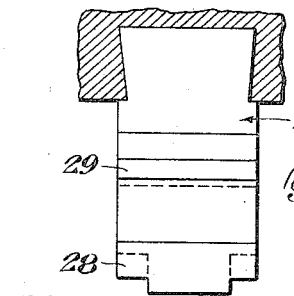
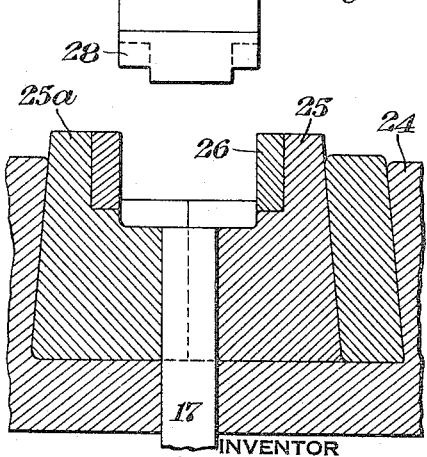
INVENTOR
Earl C. Abbe
BY
ATTORNEYS Patented Feb. 18, 1936

2,031,244

UNITED STATES PATENT OFFICE 2,031,244

METHOD OF MAKING HINGE LEAVES

Earl C. Abbe, Longmeadow, Mass., assignor to Moore Drop Forging Company, Springfield, Mass., a corporation of Massachusetts Application September 15, 1932, Serial No. 633,230

1 Claim. (Cl. 29—11)

My invention provides a method designed particularly for forming the female leaves of hinges economically and accurately.

The accompanying drawings illustrate an embodiment of the invention.

Fig. 1 is a vertical longitudinal section of a forging or hammer punch and die and a blank in place therein.

Fig. 2 is a section of the same on the line 2—2 of Fig. 1.

Fig. 3 is an underside plan of the punch and Fig. 4 a top plan of the die.

Figs. 9 and 10 are side and front views of one blank for a leaf hinge made from the forged product of Fig. 8.

Fig. 11 is a central vertical section of a coin press used for converting the semi-finished leaf of Fig. 9 to the finished form.

Fig. 12 is a plan of the lower die of the coin press.

Fig. 13 is a cross section of the lower die, with the upper die or punch in elevation above it.

Figs. 14 and 15 are side and front views of the finished product.

The original blank is subjected to certain operations in a forging or hammer press which produce a semi-finished product consisting of a plurality of hinge leaves roughly formed. These are then separated by trimming and finally shaped in the coin press.

The forging operation is shown in Figs. 1 to 8. The press has three sections. The end of a bar of stock is introduced in succession into these sections. The first two operations distribute the metal preparatory to the third one which produces roughly the form of the desired product. This semi-finished product is then forged or finished in the finishing impression, then trimmed apart and the flash cut off the bar. The new end of the bar is then reheated and subjected to the same operations.

The first section is indicated at 1 for the punch and 2 for the die; the second section at 3 for the punch and 4 for the die. The third section is shown at 5 for the punch and 6 for the die. In this section the work is given two successive blows so as to divide the work into two operations.

Figure 5:
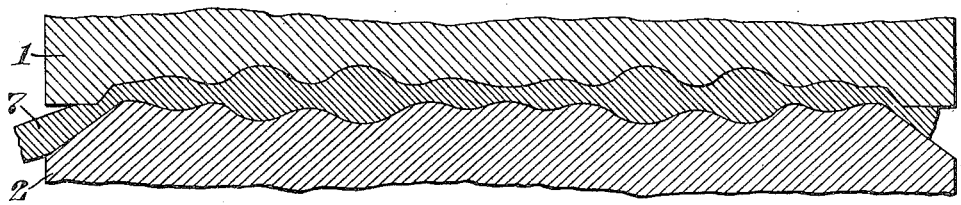
Figs. 5, 6 and 7 are vertical sections of the punch and die in operation, at different points.
Figure 6:
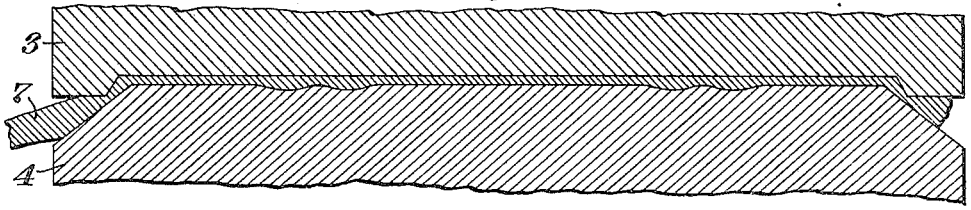

In sections 1, 2, the original plain bar 7 is thickened at certain points as in Fig. 5 and spread slightly as in Figs. 3 and 4 so as to effect a partial distribution of the metal.

In the second operation the bar 7 is spread laterally as in Figs. 3 and 4 and is restored to a substantially even thickness except at the parts which later form the pivot ends of the leaves. See Fig. 6.

Figure 7:
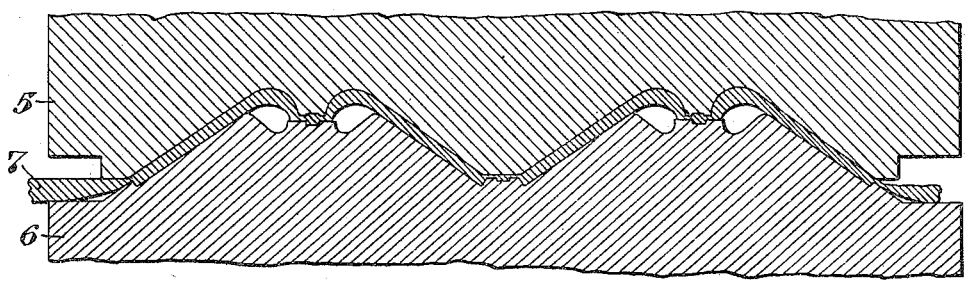
Figure 8:
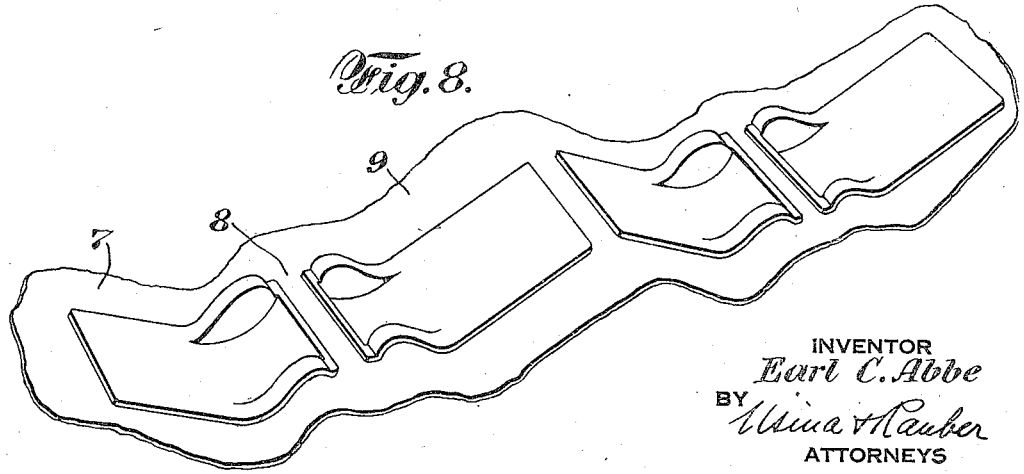
Fig. 8 is a perspective view of the forged product.

In the third operation the different leaves are defined and roughly shaped as in Figs. 1 and 7 between the portions 5 and 6 of the dies. The product is shown in Fig. 8. There are four roughly formed leaves from the original bar 7 connected to each other by thin portions 8 of metal and surrounded by rough marginal portions 9. The several parts are cut through the portions 8 and are trimmed all around, leaving such a product as is shown in Fig. 9. This semi-finished hinge leaf has a flat portion 10 of approximately the desired length with fairly thick broad ears or flanges 11 at one end and a roughly formed hood 12 curved to enclose the hinge pin and extending over a considerable portion of the peripheries of the ears 11.

The preliminary impressions in the forging or hammer press spread and bunch the stock as required to more easily form the product in the third section of these dies, thus making it possible to use a smaller bar than would be required if we were to attempt to secure the desired shape directly from the plain bar.

The rolled bar, say 5 or 6 feet long, is heated (for ordinary hinge steel) for a distance of say 21 inches and the heated portion presented successively and rapidly to the four forging operations stated. The hammer may make 50 to 60 blows per minute. Thus the bar loses little heat in the extremely short time required for the complete forging.

It is also advantageous to have the closely grouped sections, which make it practical to use commercial hot rolled bars of moderate size. If spreading and bunching were not resorted to, a much larger bar would be necessary, equal to the section of the hood of the hinge leaf. After the finishing blow, the string of four forgings is cut off by trimming and the bar returned to the furnace for another heat.

The bar is successively heated, forged and cut off until it is all worked up, the rear end being held in tongs during the forging operation.

The forging dies are self-aligning, the walls 13 of the upper die interlocking with the walls 14 of the lower one. The inclined surface G, Fig. 1, of the upper die also engaging with the corresponding surface H of the lower die when the two are brought together.

The product when cut apart results in a substantially perfectly formed hinge leaf, excepting that the ears 11 are spread apart at the slight angle indicated by the faces 15, 16, Fig. 2, of the dies and except for certain other deficiencies hereinafter related. These compound dies (punch and die) are very rugged with no excessively prominent parts. Hence the heat absorbed from the forging is quickly dissipated to the heavy portion of the block in which the dies are carried. This tends to keep the smaller sections, such as 18, Fig. 2, to a comparatively low temperature at which the metal will not soften, and hence tends to give a much longer life.

The products of this forging operation may be finished in various ways. I design the forging dies, however, specially to produce a product which can be quickly and cheaply brought to finished shape in the coin press of Figs. 11, 12 and 13. This press bends up the ears, corrects the distance between the same to very close limits, coining or finishing the product over its entire surface and squaring up and setting all of the corners including the end of the leaf.

The finished product, Fig. 14, has its flat portion 19 smoothly finished and its free edge 20 formed smoothly and to give the exactly desired length. The side edges 21 are similarly finished. The ears 22 are set squarely at right angles to the body of the leaf. The hood 23 is also brought around to the desired point so that its edge is approximately in a plane passing through the centers of the ears and at right angles to the body 19 of the leaf. The only further operation necessary would be machining operations such as drilling and polishing or grinding, etc.

The coin press is a single-action toggle press of common type with a bottom knock-out 17. The base is a heavy die-holder 24 in which the lower die made in halves 25, 25a is keyed. In each half of this die, where the ear of the hinge leaf is to be formed, there is a renewable wearing piece 26. The punch 27 is arranged with a renewable form piece 28 and fillers (one or more) 29 which determine the length of the body 19 of the leaf.

The forging is laid on the die and the punch descends carrying the work down, first squaring up the ears by contact with the pieces 26 and then coining or pressing the hinge over its entire surface, squaring up and setting all the corners, including the end of the leaf.

The parts 26 and 28 provide small pieces which can be quickly changed when worn. Owing to their comparatively small size, they can be made of high grade steel without undue expense.

The coin-pressing operation is performed with the body of the work set at a lesser angle to the direction of movement of the punch, compared with the angle in the rough forging operation. Compare Figs. 1 and 11. Consequently the final operation deepens the hood and brings it further around the ears. Compare Figs. 9 and 14. Extreme accuracy in dimensions is necessary and is secured at the most important points by the removable members, particularly the hood-forming piece 28 of the punch and the side liners 26 of the die recess. The product is gauged frequently in production and is kept within very narrow tolerances by replacing the inserts,—that is the hood-forming member 28 and the liners 26, whenever the product is shown to be oversize or undersize in the dimensions that are formed by these pieces. The piece 29 is made removable for the same reason and also to vary the length of the leaf at will.

It will be seen from Fig. 1 that the portions G, H of the punch and die which form the body 10 of the hinge lead are set at an angle of somewhat more than 30 degrees with the horizontal (assuming that the punch operates in a vertical line). This permits the hood-forming parts of the apparatus to extend the hood 12 well around the ears 11, without interfering with the vertical movement of the punch. It is desirable to have the hood extended in this way so as to provide for its modification in the subsequent coin pressing operation.

The height of the projections on the faces of the dies is kept down for strength and durability. On the two preliminary impressions, particularly that shown in Fig. 5, the maximum elevation is a little less than the depth of the hood for each die. The angular arrangement of the forming surfaces in Fig. 7 is also such as to keep the projections on the working faces of the dies within a limit equal to the depth of the hood.

By building the coin pressing die in sections we facilitate machining and hardening and grinding operations; and in case of breakage, this is apt to happen only to one section.

The complete process produces hinge leaves very accurately dimensioned and finished, particularly on the faces which engage the mating leaf of the hinge. The forging or rough-shaping involves a succession of light swaging operations which are performed with short strokes in such rapid succession that they may be completed with one heating the work. Nevertheless the trimmed product of the first set of operations is so nearly perfect that the work required in coin pressing is light and a high grade product is produced rapidly and at low cost.

The invention may be applied to the producing of a single semi-finished blank in the forging operation instead of by a plurality of blanks as described. Various other modifications may be made by those skilled in the art without departure from the invention as defined in the following claim.

What I claim is:

The method of forming hinge leaves having a body with ears at one end and a hood extending around the ears, which comprises forging a bar to increase its thickness at a point corresponding to the hooded end, then forging it to increase its width at about the same point, then forging it to form the hinge bodies at a comparatively wide angle to the direction of the forging movement and to form the ears in diverging positions and a shallow hood and trimming the work-pieces to approximate dimensions and, finally, coin-pressing them with the body at a comparatively narrow angle to the direction of the pressing movement so as to bring the ears parallel to each other and to deepen the hood and bring it further around the ears and to smooth the faces and square the edges and bring them accurately to final dimensions.

EARL C. ABBE.